(12) United States Patent
Lu

(10) Patent No.: US 9,156,232 B2
(45) Date of Patent: Oct. 13, 2015

(54) ENVIRONMENTALLY-FRIENDLY POLYURETHANE MATTING AND THE METHOD OF PRODUCTION THEREOF

(71) Applicant: Xiangyang Lu, Xiamen (CN)

(72) Inventor: Xiangyang Lu, Xiamen (CN)

(*) Notice: Subject to any disclaimer, the term of this patent is extended or adjusted under 35 U.S.C. 154(b) by 39 days.

(21) Appl. No.: 14/115,111

(22) PCT Filed: Sep. 18, 2012

(86) PCT No.: PCT/CN2012/081520
§ 371 (c)(1),
(2) Date: Nov. 1, 2013

(87) PCT Pub. No.: WO2014/043848
PCT Pub. Date: Mar. 27, 2014

(65) Prior Publication Data
US 2014/0242397 A1    Aug. 28, 2014

(51) Int. Cl.
*B32B 27/06* (2006.01)
*B32B 27/40* (2006.01)
*B32B 37/10* (2006.01)
*A47G 27/02* (2006.01)
*B32B 9/02* (2006.01)
*B29C 67/24* (2006.01)
*B29L 31/00* (2006.01)
*B29K 75/00* (2006.01)

(52) U.S. Cl.
CPC ............ *B32B 27/06* (2013.01); *A47G 27/0212* (2013.01); *B29C 67/246* (2013.01); *B32B 9/025* (2013.01); *B32B 37/1009* (2013.01); *B29K 2075/00* (2013.01); *B29L 2031/7324* (2013.01); *Y10T 428/31558* (2015.04)

(58) Field of Classification Search
CPC .... B32B 27/06; B32B 27/40; B32B 37/1009; B32B 9/025; C08G 18/48; C08G 18/4833; C08G 18/4854; C08G 18/4883; C08G 18/82; A47G 27/0212; B29C 67/246; Y10T 428/31558; B29L 2031/7324; B29K 2075/00
USPC ....................................... 428/423.4; 156/242
See application file for complete search history.

(56) References Cited

U.S. PATENT DOCUMENTS

| 4,849,145 A * | 7/1989 | Hirsch ..................... 264/46.4 |
| 5,308,234 A * | 5/1994 | Nicke et al. .................. 425/188 |
| 2010/0310882 A1* | 12/2010 | Ogawa et al. ............. 428/423.4 |

* cited by examiner

*Primary Examiner* — Thao T Tran
(74) *Attorney, Agent, or Firm* — Gokalp Bayramoglu

(57) ABSTRACT

The present invention discloses an environmentally-friendly polyurethane matting and a method of production thereof. The environmentally-friendly polyurethane matting comprises a leather surface, a polyurethane middle layer and an anti-slip leather bottom layer. The present invention is applied with the polyurethane instead of silica gel. The polyurethane avoids oil seepage when the matting is used, as is therefore environmentally-friendly fire proof, and safe. The elasticity and other performance of the polyurethane are hardly changed during usage, and environmentally-friendly polyurethane matting provides comfort and enhances the tactile feeling when people standing on the matting. Further, the matting has a long service life.

8 Claims, 6 Drawing Sheets

ENVIRONMENTALLY-FRIENDLY POLYURETHANE MATTING AND THE METHOD OF PRODUCTION THEREOF

FIELD OF THE INVENTION

The present invention relates to an environmentally-friendly polyurethane matting and the method of production thereof.

BACKGROUND OF THE INVENTION

A structure of a kitchen matting of the conventional technology is illustrated in FIG. 1, comprising three layers: a leather surface 10, a silica gel middle layer 20 and an anti-slip leather bottom layer 30. Alternatively, an elastic middle layer 40 is further disposed between the silica middle layer 20 and the anti-slip leather bottom layer 30 to form a four-layer structure. The elastic middle layer 40 is made of PE (polyethylene), sponge, NBR (nitrile-butadiene rubber), EVA (vinyl acetate-maleic anhydride copolymer), TPE (thermoplastic elastomer), PVC (Polyvinyl chloride), rubber foaming material, SBR (styrene-butadiene rubber), CR (chloroprene rubber) or NR (natural rubber). The elastic middle layer 40 is capable of reducing the cost, increasing the thickness of matting and enhancing the tactile comfort to the user.

However, during the production process of the conventional matting, the silica gel middle layer 20 is made by mixing silica gel and mineral oil, and then the silica gel middle layer 20 is combined with other layers by heating and melting. Thus, when the conventional method is used, oil seepage occurs as a result of mineral oil being disposed in the matting. Therefore the process and ensuing product is not environmentally-friendly and catches fire easily. Besides, after a period of time, the mineral oil is volatilized, the silica gel middle layer 20 becomes hard, the border of the matting is warped therefore affecting the tactile comfort and shortening the service life.

SUMMARY OF THE INVENTION

The object of the present invention is to provide an environmentally-friendly polyurethane matting and a method of production thereof.

To achieve the above object, the technical solution of the present invention is as below:

An environmentally-friendly polyurethane matting comprises a leather surface, a polyurethane middle layer and an anti-slip leather bottom layer.

An elastic middle layer is disposed between the polyurethane middle layer and the anti-slip leather bottom layer, the elastic middle layer is made of PE (polyethylene), sponge, NBR (nitrile-butadiene rubber), EVA (vinyl acetate copolymer), TPE (thermoplastic elastomer), PVC (polyvinyl chloride), rubber foaming material, SBR (styrene-butadiene rubber), CR (chloroprene rubber) or NR (nat rubber).

The polyurethane is a double-composition material, materials comprising a polyether glycol intermixture and isocyanate that are mixed by a polyurethane foaming machine (the mass ratio of the isocyanate to the polyether glycol is 100:17~22), after high speed grinding, and mixing, the polyurethane is injected into a mold for compression moulding. The molecular weight of the polyether glycol being 5000.

The present invention is applied with polyurethane instead of silica gel, as the polyurethane is a polymer made of isocyanate and polyether glycol or polyester polyol or/and small molecule polyhydric alcohol, polyamine or other chain extender or crosslinking agent, after high speed grinding and mixing, the polyurethane is injected into the mould for moulding compressing, the production is simple, no mineral oil contained in the materials, thus avoiding oil seepage when the matting is used, as is therefore environmentally-friendly, fire proof, and safe. The elasticity and other performance of the polyurethane are hardly changed during usage, it is with high heat-resisting and high weatherability, providing comfort and enhancing the tactile feeling when people stand on the matting, it is easy to be fold, there is no wrinkle. Further, the matting has a long service life.

DETAILED DESCRIPTION

Figure 1:
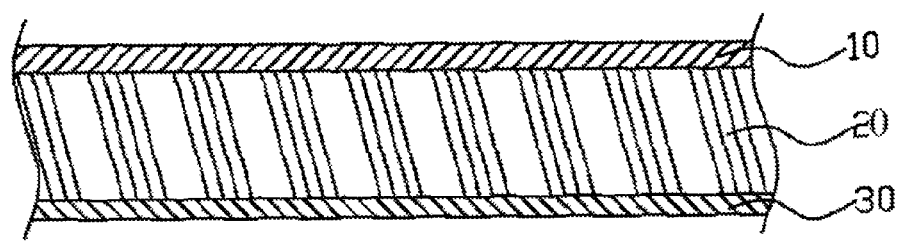
FIG. 1 illustrates a first schematic diagram of a structure of the conventional technology.
Figure 2:
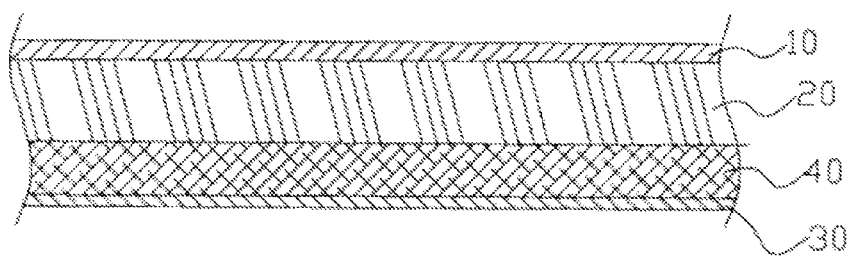
FIG. 2 illustrates a second schematic diagram of a structure of the conventional technology.
Figure 3:
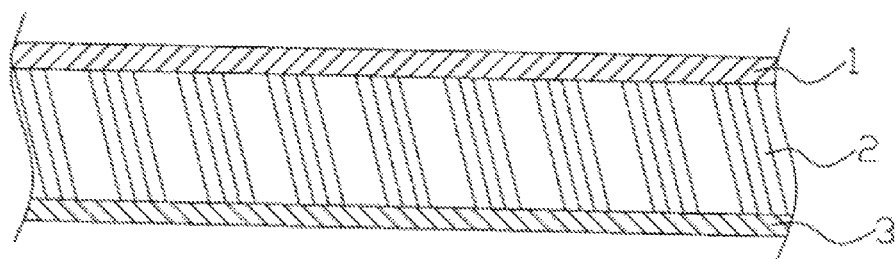
FIG. 3 illustrates a first schematic diagram of a structure of the present invention.
Figure 4:
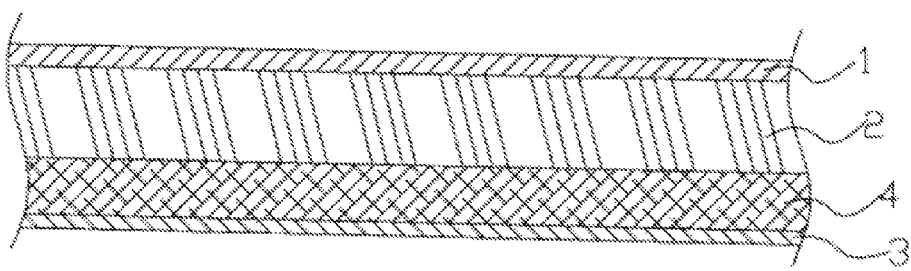
FIG. 4 illustrates a second schematic diagram of a structure of the present invention.

As illustrated in FIG. 3, the present invention discloses an environmentally-friendly polyurethane matting, which includes a leather surface 1, a polyurethane middle layer 2 and an anti-slip leather bottom layer 3. To increase the thickness of the matting and to improve the tactile feeling, an elastic middle layer 4 is further disposed between the polyurethane middle layer and the anti-slip leather bottom layer 3 as illustrated in FIG. 4. The elastic middle layer 4 is made of PE (polythene) or sponge, NBR (nitrile-butadiene rubber), EVA (vinyl acetate-maleic anhydride copolymer), TPE (thermoplastic elastomer), PVC (polyvinyl chloride), rubber foaming material, SBR (styrene-butadiene rubber), CR (chloroprene rubber) or NR (natural rubber).

The polyurethane is a polymer made from isocyanate and polyether glycol or polyester polyol or/and small molecule polyhydric alcohol, polyamine or other chain extender or crosslinking agent. For example, A. The polyurethane is a polymer made of polyisocyanate and polyether glycol. For example B, the polyurethane is a polymer made of polyisocyanate and polyester polyol. For Example C, The polyurethane is a polymer made of polyisocyanate and small molecule polyhydric alcohol. For example D, The polyurethane is a polymer made of polyisocyanate and polyamine.

The polyurethane is mixed with isocyanate and polyether glycol according to the mass ratio 100:17~22, the molecular weight of the polyether glycol is 5000, but not limited to this. In another preferred embodiment, the mass ratio of the isocyanate to the polyether glycol is 100:19~21. During the production process, after grinding and mixing at high speed, there is a chemical reaction between the isocyanate and the polyether glycol with the presence of a catalyst. Then the mixture is cured and moulded as the polyurethane middle layer 2. When the mass ratio of the isocyanate to the polyether glycol is 100:19, the polyurethane middle layer 2 is slightly softer compared to a hardness standard; when the mass ratio of the isocyanate to the polyether glycol of the present invention is 100:20, the polyurethane middle layer 2 conforms to the standard; when the mass ratio of the isocyanate to the polyether glycol is 100:21, the polyurethane middle layer 2 is slightly harder compared to the standard.

As needed, the polyether glycol can be applied with polyether glycol mixture, which mainly includes one or more raw materials, but is not limited to: polyether glycol, environmentally-friendly catalysts, anti-aging agents, and anti-UV agents. The environmentally-friendly catalyst is applied with bismuth catalyst, which is 19% bismuth. The anti-aging, agent is applied with anti-aging agent 264, also known as 2,6-DI-tert-butyl-4-methyl phenol. The anti-LTV agent is applied with N-(Ethoxycarbonylphenyl)-N'-Methyl-N'-Phenylformamidine.

Figure 5:
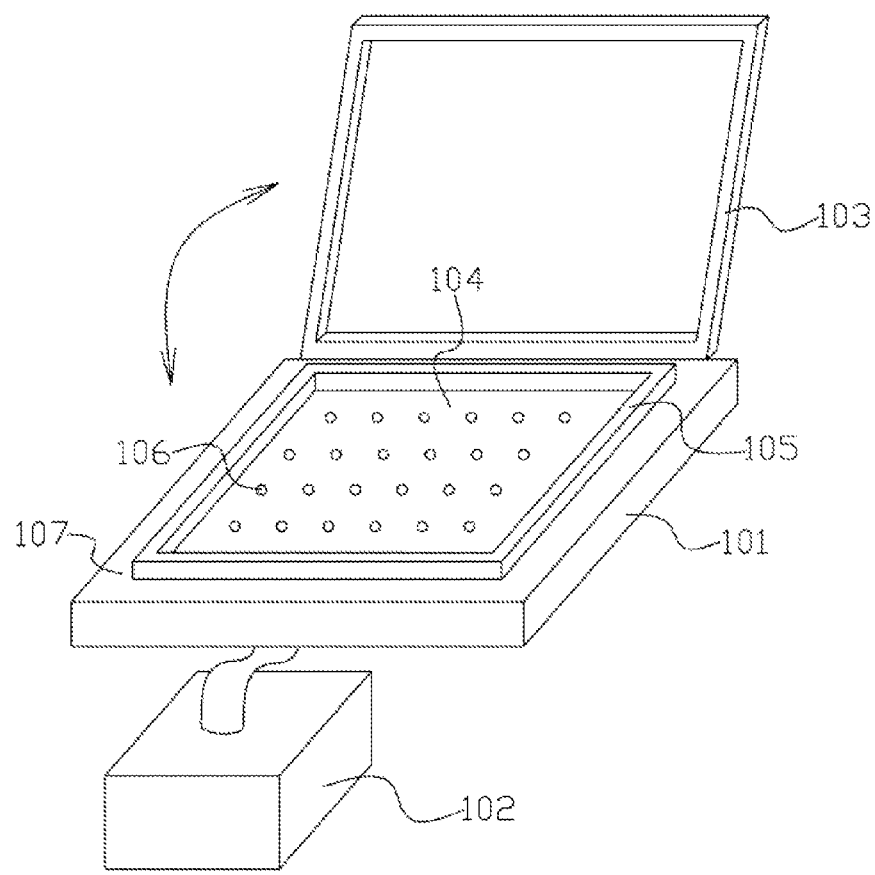
FIG. 5 illustrates a first schematic diagram of a structure of production equipment of the present invention.
Figure 6:
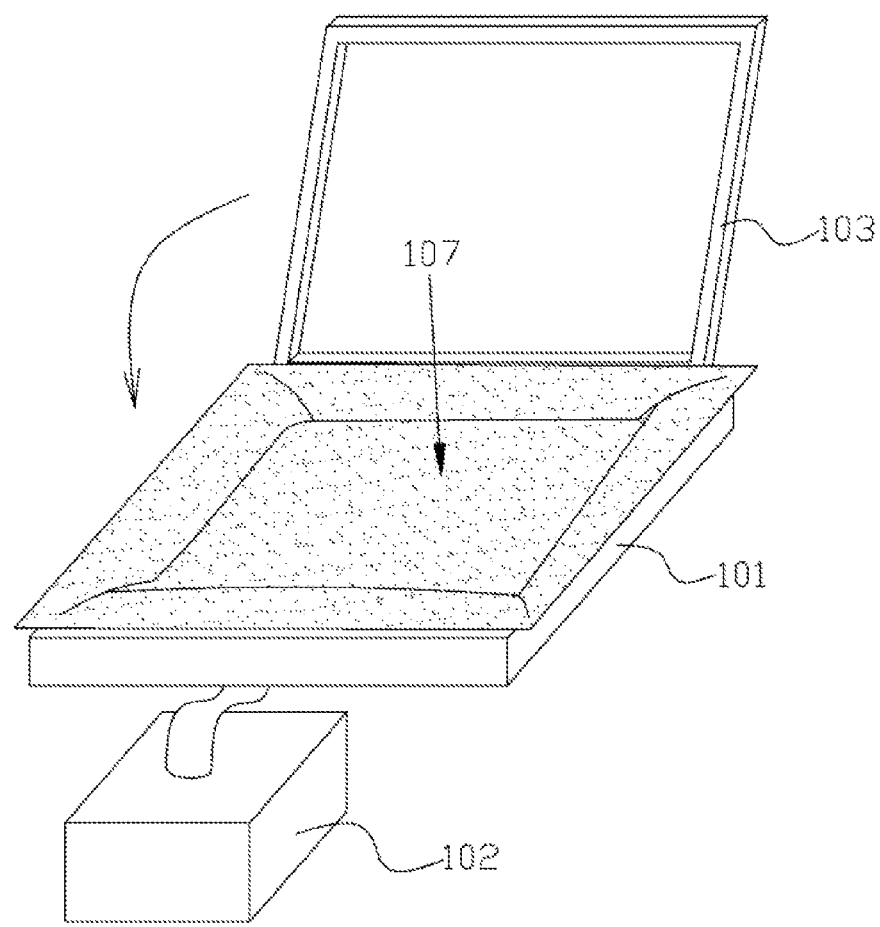
FIG. 6 illustrates a second schematic diagram of a structure of production equipment of the present invention.
Figure 7:
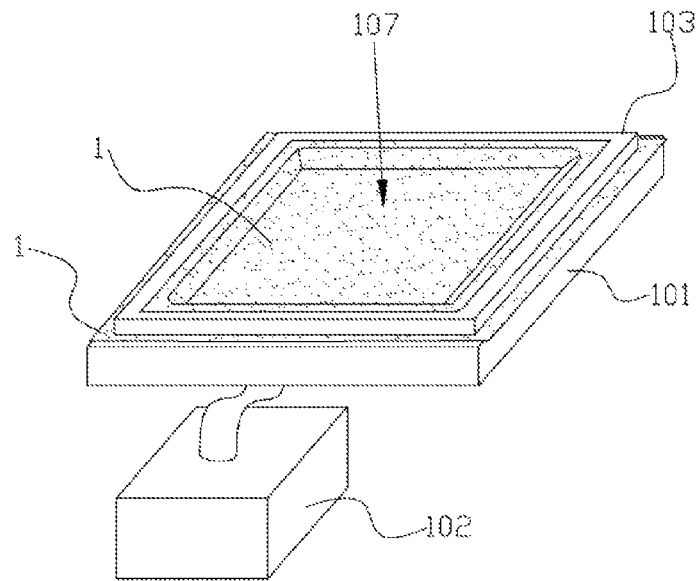
FIG. 7 illustrates a third schematic diagram of a structure of production equipment of the present invention.
Figure 8:
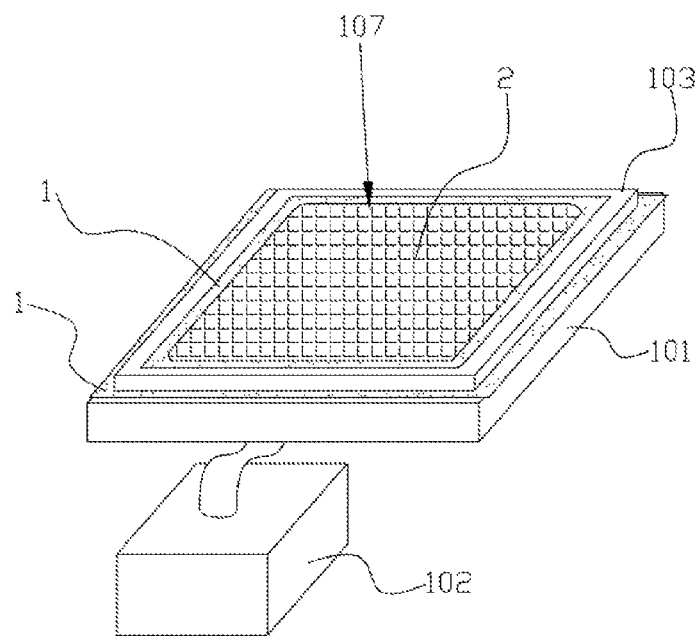
FIG. 8 illustrates a forth schematic diagram of a structure of production equipment of the present invention.
Figure 9:
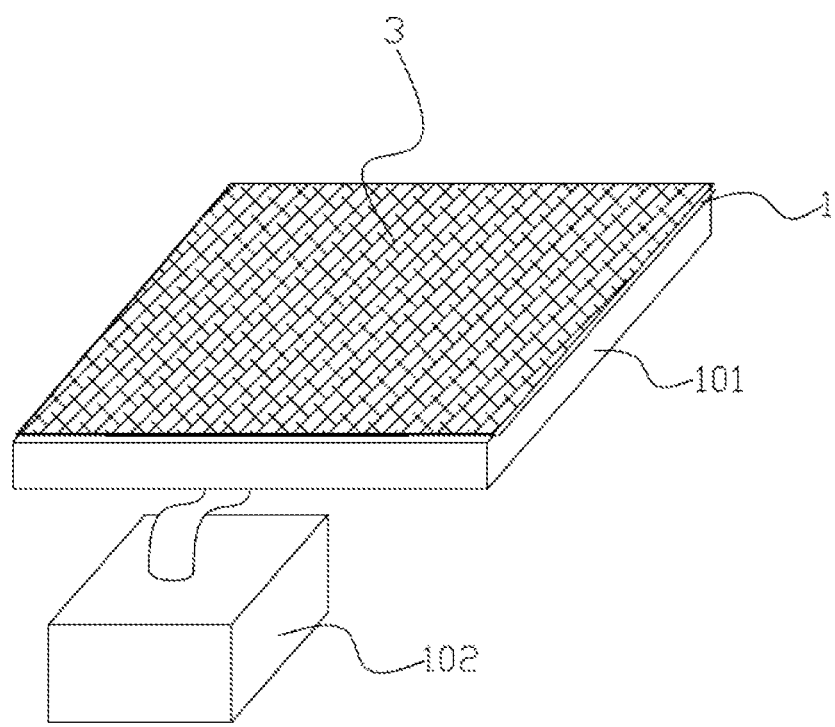
FIG. 9 illustrates a fifth schematic diagram of a structure of production equipment of the present invention.
Numeral references: leather surface 10, silica gel middle layer 20, anti-slip leather bottom layer 30, elastic middle layer 40, leather surface 1, polyurethane middle layer 2, anti-slip leather bottom layer 3, elastic middle layer 4

Please refer to FIG. 5, a base 101, a suction mechanism 102 and a clamping ring 103 are provided; wherein the middle of the top surface of the base 101 is concaved to be a cavity, which is disposed with a bottom surface 104 and a wall 105 surrounding the bottom surface 104, the bottom surface 104 of the cavity is disposed with several suction holes 106; the suction mechanism 102 is connected to the suction holes 106; the clamping ring 103 is connected to the base 101 and is capable of rotating between an open position and a closed position around the base 101. When the clamping ring 103 is situated in the open position, a space is formed between the clamping ring 103 and the base 101, for example, they form an obtuse angle. When the clamping ring 103 is situated in the close position, the clamping ring 103 is placed outside the wall 105;

Please refer to FIG. 5. Rotate the clamping ring 103 to make it situated in the open position;

Please refer to FIG. 6. Put the leather surface 1 on the cavity of the base 101, the periphery of the leather surface 1 is extended out of the wall 105 of the cavity, the suction mechanism 102 pumps air to make the leather surface 1 stick via suction to the bottom wall 104 of the cavity, forming a retaining cavity 107 on the leather surface 1;

Please refer to FIG. 7. Rotate the clamping ring 103 to make it situated in the closed position, the clamping ring 103 is sleeved on the outside of the wall 105 and it is pressed against the periphery of the leather surface 1;

Please refer to FIG. 8. Inject polyurethane after high speed grinding and mixing in a retaining cavity 107 of the leather surface 1, because the polyurethane is in liquid form, it needs no pressing work. The polyurethane moves to form a layer structure to serve as the polyurethane middle layer 2;

Please refer to FIG. 9. Put an anti-slip leather bottom layer 3 onto the polyurethane middle layer 2;

The suction mechanism 102 stops working and the suction holes are cut off. A semi-manufactured matting composed of the leather surface, the polyurethane middle layer and the anti-slip leather bottom layer is produced. Using a high frequency welder, the peripheries of the anti-slip leather bottom layer and the leather surface are pressed, welded and connected together; the high frequency welder can be applied to any exiting semi-manufactured matting, and the of the high frequency welder power can be ranged from 30kw to 100kw.

Cut of the remaining leftover portions of the matting.

In another embodiment, a portion of the wall of the top surface of the base 101 is concaved to be a concave portion 108, when the clamping ring 103 is situated in the close position, it is sleeved on the outside of the wall 105 and supported against the bottom surface of the concave portion 108. As needed, a lock catch is further disposed on the base, for locking the periphery of the leather surface 1 is to the base.

As needed, the object of present invention can be realized without clamping ring. For example, the method comprises:

A base 101 and a suction mechanism 102. The middle of the top surface of the base 101 is concaved to be a cavity, which is disposed with a bottom surface 104 and a wall 105 surrounding the bottom surface 104, the bottom surface 104 of the cavity is disposed with several suction holes 106; the suction mechanism 102 is connected to the suction holes 106;

Put the leather surface 1 on the cavity of the base 101, the periphery of the leather surface 1 is extended out of the wall 105 of the cavity, the suction mechanism 102 pumps air to make the leather surface 1 stick via suction to the bottom wall 104 of the cavity, forming a retaining cavity 107 on the leather surface 1;

Inject polyurethane after high speed grinding and mixing in the retaining cavity 107 of the leather surface 1, the polyurethane moves to form a layer structure to serve as the polyurethane middle layer 2;

Put an anti-slip leather bottom layer 3 onto the polyurethane middle layer 2; the suction mechanism 102 stops working and the suction holes are cut off, get out of the semi-manufactured matting composed of the leather surface, the polyurethane middle layer and the anti-slip leather bottom layer; by a high frequency welder, the peripheries of the anti-slip leather bottom layer and the leather surface are pressed, welded and connected together;

Cut off the remaining leftover of the matting.

In another preferred embodiment, after forming the semi-manufactured matting with a leather surface, the polyurethane middle layer and the anti-slip leather bottom layers are taken out. Then, a rectangular frame is further disposed to press the peripheries of the anti-slip leather bottom layer and the leather surface. Then, by using a high frequency welder, the peripheries of the anti-slip leather bottom layer and the leather surface are pressed, welded and connected together.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

I claim:

1. An environmentally-friendly polyurethane matting, comprising a leather surface, a polyurethane middle layer and an anti-slip leather bottom layer,
    wherein the polyurethane middle layer is thicker than the anti-slip leather bottom layer;
    wherein the polyurethane middle layer is made of isocyanate and polyether glycol according to a mass ratio 100:17-72.

2. The environmentally-friendly polyurethane matting according to claim 1, wherein an elastic middle layer is disposed between the polyurethane middle layer and the anti-slip leather bottom layer, the elastic middle layer is made of PE, sponge, NBR, EVA, TPE, PVC, rubber foaming material, SBR, CR or NR.

3. The environmentally-friendly polyurethane matting according to claim 1, wherein the polyurethane is a double-composition material, comprising the polyether glycol mixture and the isocyanate that are mixed by a polyurethane foaming machine, and injecting into a mold for compression molding after high speed grinding and mixing the molecular weight of the polyether glycol being 5000.

4. The environmentally-friendly polyurethane matting according to claim 1, wherein the polyurethane is injected into a mold for compression molding, after high speed grinding and mixing of the isocyanate and the polyether glycol.

5. The environmentally-friendly polyurethane matting according to claim 1, wherein the polyurethane is injected into a mold for compression molding after high speed grinding and mixing of the isocyanate, the polyether glycol, and a small molecule polyhydric alcohol.

6. The environmentally-friendly polyurethane matting according to claim 1, wherein the polyurethane is injected into a mold for compression molding after high speed grinding and mixing of the isocyanate, the polyether glycol, and a polyamine.

7. A method for producing an environmentally-friendly polyurethane matting, the process comprising
- providing a base, a suction mechanism and a clamping ring; wherein the middle of the top surface of the base is concaved to be a cavity, which is disposed with a bottom surface and a wall surrounding the bottom surface, the bottom surface of the cavity s disposed with several suction holes; the suction mechanism is connected to the suction holes; the clamping ring is connected to the base and capable of rotating between an open position and a closed position around the base;
- moving the clamping ring to make the clamping ring situated in the open position;
- disposing a leather surface on the cavity of the base, wherein the periphery of the leather surface is extended out of the wall of the cavity, the suction mechanism pumps air to make the leather surface stick via suction on the bottom wall of the cavity, and a retaining cavity is formed on the leather surface;
- moving the clamping ring to make the clamping ring situated in the close position, wherein the clamping ring is sleeved on the outside of the wall of the cavity and pressed against the periphery of the leather surface;
- injecting polyurethane into the retaining cavity of the leather surface, wherein the polyurethane is formed as a polyurethane middle layer;
- laminating an anti-slip leather bottom layer onto the polyurethane middle layer;
- connecting the peripheries of the anti-slip leather bottom layer and the leather surface by welding.

8. A method for producing an environmentally-friendly polyurethane matting, the process comprising:
- providing a base and a suction mechanism; wherein a lock catch is further disposed on the base; wherein the middle of the top surface of the base is concaved to be a cavity, which is disposed with a bottom surface and a wall surrounding the bottom surface, the bottom surface of the cavity is disposed with several suction holes; the suction mechanism is connected to the suction holes;
- disposing a leather surface on the cavity of the base, wherein the periphery of the leather surface is extended out of the wall of the cavity, the suction mechanism pumps air to make the leather surface stick via suction on the bottom wall of the cavity, and a retaining cavity is formed on the leather surface;
- locking the periphery of the leather surface to the base via the lock catch:
- injecting polyurethane into the retaining cavity of the leather surface, the polyurethane is formed as a polyurethane middle layer;
- laminating an anti-slip leather bottom layer onto the polyurethane middle layer;
- connecting the peripheries of the anti-slip leather bottom layer and the leather surface by welding.

\* \* \* \* \*